United States Patent [19]

Howard

[11] Patent Number: 4,795,865
[45] Date of Patent: Jan. 3, 1989

[54] SAFETY SWITCH FOR AUTOMATIC DE-ACTIVATION OF A MOTOR VEHICLE

[75] Inventor: William A. Howard, Burton, Ohio

[73] Assignee: Delta Systems, Inc., Streetsboro, Ohio

[21] Appl. No.: 130,984

[22] Filed: Dec. 10, 1987

[51] Int. Cl.⁴ .................... H01H 3/02; H01H 13/52
[52] U.S. Cl. ............................... 200/85 A; 200/530
[58] Field of Search .............. 200/16 B, 16 E, 61.76, 200/61.77, 61.78, 61.81, 67 C, 85 R, 85 A, 159 R, 160, 276, 295, 296, 329, 330, 340, 303

[56] References Cited

U.S. PATENT DOCUMENTS

| | | | |
|---|---|---|---|
| 1,513,664 | 10/1924 | Williamson | 200/85 A |
| 2,169,996 | 8/1939 | Edwards | 200/159 R |
| 2,491,447 | 12/1949 | Hull | 200/159 R X |
| 3,172,981 | 3/1965 | Loesch | 200/61.76 X |
| 3,767,878 | 10/1973 | Sykora | 200/159 R |
| 3,792,219 | 2/1974 | Rowley | 200/276 X |
| 3,895,203 | 7/1975 | Leworthy | 200/276 |
| 3,946,181 | 3/1976 | Takamizawa et al. | 200/159 R |
| 4,209,682 | 6/1980 | Rood | 200/159 R |
| 4,386,252 | 5/1983 | Kondo et al. | 200/296 |
| 4,473,727 | 9/1984 | Beck | 200/16 A |
| 4,488,018 | 12/1984 | Hayashida | 200/276 |

Primary Examiner—J. R. Scott
Attorney, Agent, or Firm—Watts, Hoffmann, Fisher & Heinke

[57] ABSTRACT

A safety switch assembly for de-activating a motor vehicle if a user is not positioned on a vehicle seat. The assembly includes a base for mounting the assembly, a cover that moves in response to the presence of a vehicle operator on the seat and an actuator that moves with the cover to open and close switch contacts inside an actuator housing. The contacts are normally open or normally closed depending on the switch construction. Movement of the cover forces the actuator to cause a torsion spring switch piece to bridge a gap between the contacts in a normally open switch and moves the switch piece from between the contacts in a normally closed switch.

4 Claims, 4 Drawing Sheets

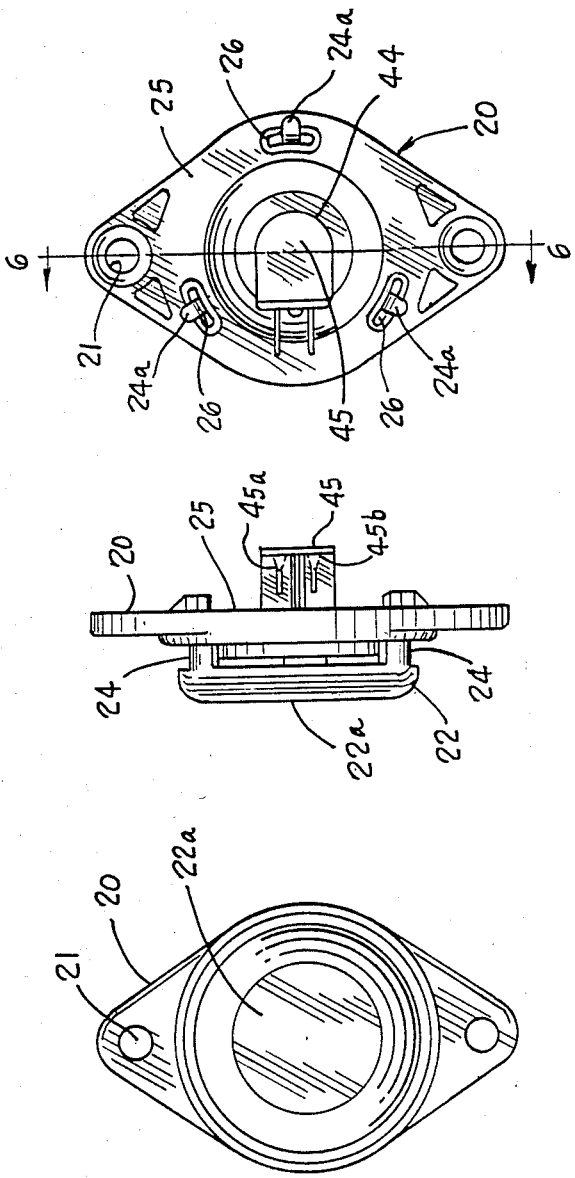

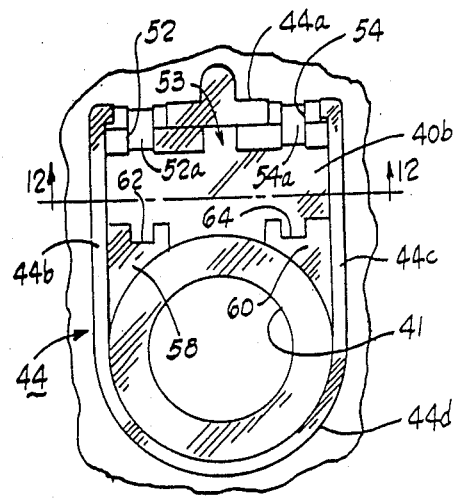
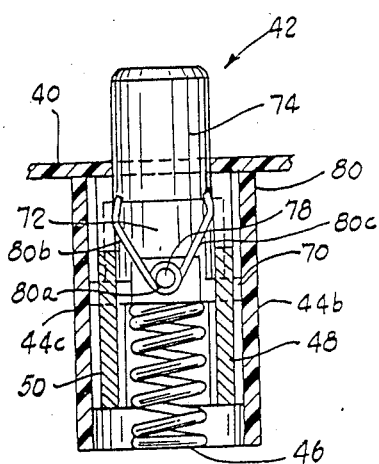
Fig. 7
Fig. 8
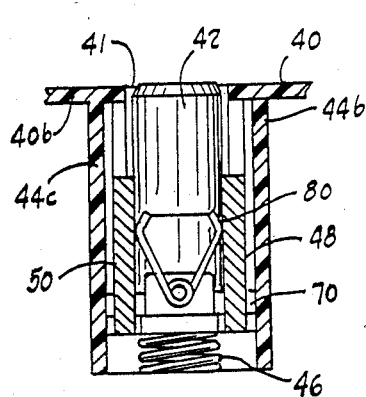
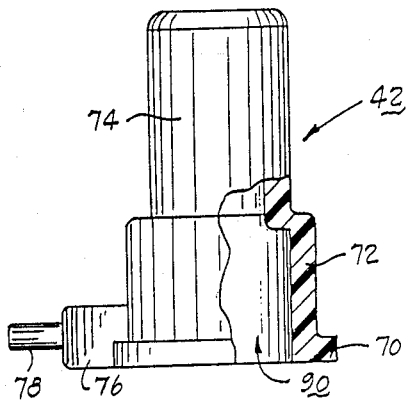
Fig. 9
Fig. 10

SAFETY SWITCH FOR AUTOMATIC DE-ACTIVATION OF A MOTOR VEHICLE

DESCRIPTION

1. Technical Field

The present invention relates to an improved safety switch for de-activating a motor vehicle if an operator is not safely seated on the motor vehicle.

2. Background Art

It is known in the prior art to automatically deactivate a motor vehicle in the event a vehicle operator is not safely seated on the vehicle seat. This safety measure has been used, for example, with riding lawn mowers where it is desirable to de-activate the mower and mower blade if the operator either falls or gets off the lawn mower.

A prior art safety seat switch assembly known to applicant utilizes a microswitch in the vehicle ignition circuit. The switch assembly uses a coiled spring that biases a switch cover away from the switch. When the operator is seated on the vehicle, the force of engagement between the operator and the switch cover is sufficient to overcome the spring constant of the spring and close a switch contact. If the operator falls from the seat, the spring is free to open the switch contacts and de-activate the vehicle.

DISCLOSURE OF THE INVENTION

It is one object of the invention to provide a relatively simple, easy to install safety switch having a switch contact, switch actuator, and switch cover that engages the actuator. The switch actuator is biased to maintain the switch contact in a first position that de-activates a motor vehicle. The switch cover contacts the switch actuator and moves the switch contact to a second position when an operator is seated on the vehicle. A base supports and guides the cover for movement on the vehicle seat.

One important feature of the invention is the straightforward manner in which the safety switch can be installed. Integral with the cover are three legs that slidably engage slots in the base. The legs have flanged ends and are constructed of plastic so they are flexible. To install the cover, the legs are bent, the flanged ends are routed through the slots in the base and the legs are released to return to their initial, unflexed shape. The cover can move relative to the base as the legs slide through the slots but the flanged ends prevent spearation of the cover from the base.

In a preferred embodiment of the invention, the switch contact is normally held open by a spring that biases the switch actuator and cover away from a switch contact housing. When the vehicle operator sits on the seat, pressure exerted by the operator against the switch cover closes the switch contact, allowing the operator to start the vehicle engine. In the event the operator steps from or is thrown from the seat, the force applied to the actuator by the spring is sufficient to move both the actuator and the switch cover away from the closed position thereby de-activating the vehicle engine.

From the above it is seen that one object of the invention is a simple to install, yet reliable safety seat switch that de-activates a motor vehicle should the user fall or step from the vehicle seat. This and other objects, advantages and features of the invention will become better understood when a detailed description of the invention is described in conjunction with the accompanying drawings.

BRIEF DESCRIPTION OF THE DRAWINGS

FIG. 2 is a top plan view of the FIG. 1 switch assembly;

FIG. 3 is an elevation view of the FIG. 2 switch assembly;

FIG. 4 is a bottom plan view of the switch assembly of FIGS. 2 and 3;

FIG. 7 is a plan view of a switch actuator housing with a bottom cover and switch actuator removed for purposes of illustration;

FIG. 8 is a view of the switch actuator housing sectioned to illustrate a switch actuator biased by a spring to a position where two switch contacts open circuit an ignition circuit;

FIG. 9 is a section view of the switch actuator housing and the switch actuator moved against the biasing action of the spring to close the switch contacts;

FIG. 10 is an elevation view of the switch actuator; and

BEST MODE FOR CARRYING OUT THE INVENTION

Figure 1:
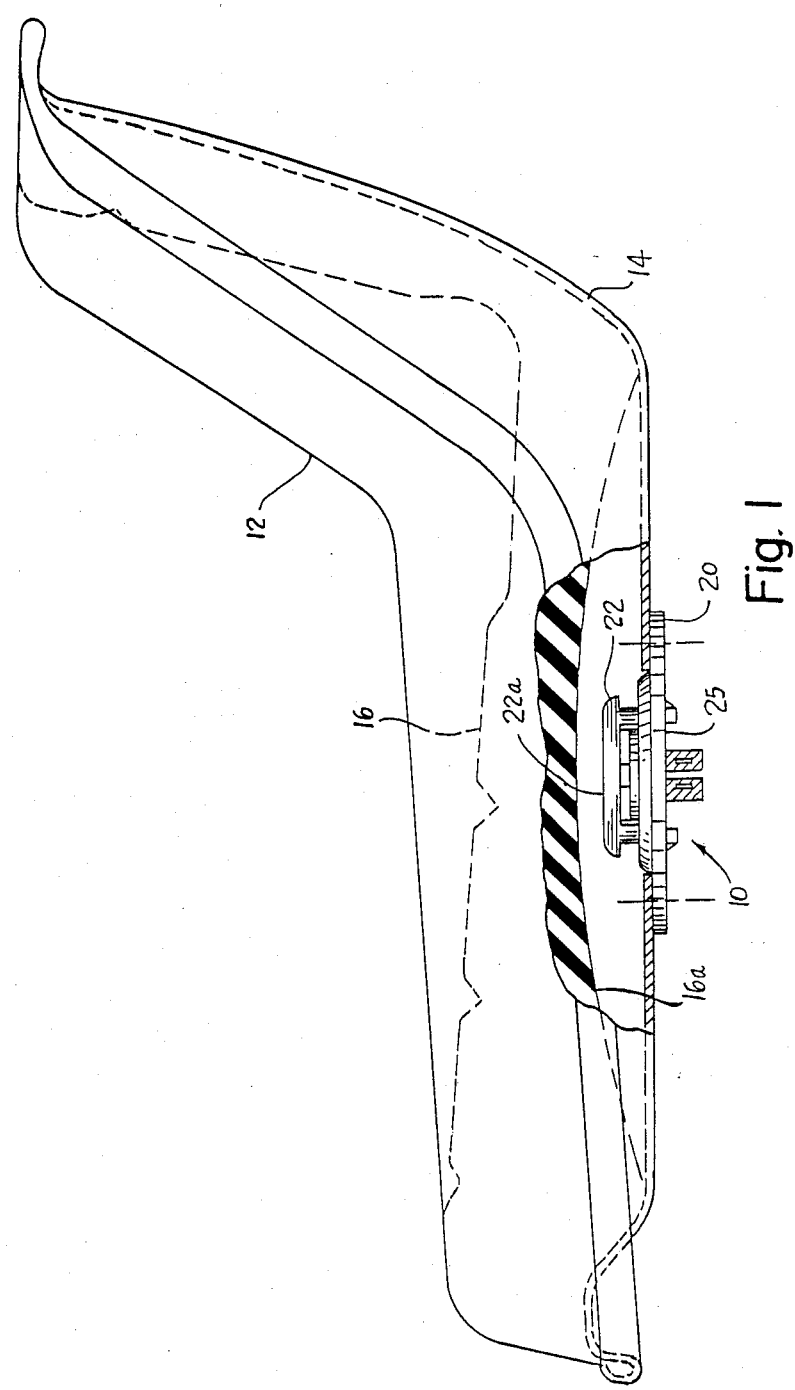
FIG. 1 is an elevation view of a vehicle seat, partially sectioned to show a safety switch assembly.

Turning now to the drawings, FIG. 1 illustrates a switch assembly 10 mounted to a seat 12 such as a riding lawn mower seat. The seat 12 shown in FIG. 1 is constructed of a seat pan 14 of metal or rigid plastic covered with a pliable cushion 16.

The switch assembly 10 has a movable cover that closes a switch contact in the ignition circuit of the vehicle when the seat cushion 16 is distorted by the weight of the operator.

Figure 5:
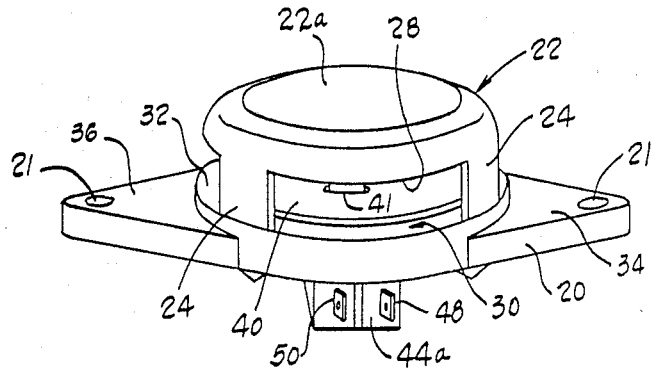
FIG. 5 is a perspective view of the switch assembly shown in FIGS. 2-4.

The switch assembly 10 is attached to a bottom surface of the seat pan 14 by suitable threaded connectors extending through a switch actuator base 20 having openings 21 (FIG. 5) to accommodate the connectors. With the assembly 10 mounted to the pan 14 a switch cover 22 coupled to the base 20 passes through a circular opening 23 created in the pan. When the seat is unoccupied, the cushion 16 defines a generally concave lower surface 16a that leaves the cover 22 in a raised position.

Integral with the cover 22 are three flexible and resilient legs 24 that connect the cover 22 to the base 20. The three legs 24 have flanged ends 24a that fit through three equally spaced openings 26 (FIG. 4) in the base 22. The legs 24 are flexed inward as the flanged ends 24a are pushed through the openings 26. In an unstressed or unflexed position, the legs are generally perpendicular to a cover surface 22a so that once the legs 24 are flexed inward and pushed into the openings 26, they return to their original shape. An outwardly facing portion of the flanged ends 24a overlaps a bottom surface 25 of the base 20 to retain the cover and limit its movement away from the base.

With the cover 22 mounted to the base 20, a downward facing lip or edge 28 of the cover 22 is positioned above a circular recess 30 in the base 20. As a vehicle operator sits on the cushion 16 the cushion contacts the cover 22 and moves it toward the base 20 so that the lip or edge 28 fits within the circular recess 30.

Radially outward of the base recess 30 the base 20 defines a narrow ridge 32. Partially bounding this ridge 32 are two oppositely extending base portions 34, 36 that define the openings 21 for mounting the switch assembly 10 to the seat pan 14. The ridge 32 fits within the opening extending through the seat pan to locate the switch assembly 10 relative the seat cushion 16.

Radially inward from the base's circular recess 30 is a central hub portion 40 that defines an aperture 41. A switch actuator 42 extends through the opening 41 and is mounted within an actuator housing 44 integral with and extending away from a bottom surface 40b of the base hub portion 40. As shown in FIGS. 7-9 and 12, the actuator housing 44 forms an enclosure bounded by three generally planar wall portions 44a, 44b, 44c and a curved wall portion 44d that bridges two opposed planar portions 44b, 44c. A housing cover 45 attached to the wall portions 44a-44d by heat sealing or welding encloses a compressed spring 46 that biases the actuator 42 through the opening 41. When a vehicle operator is seated on the seat 12, the weight of the operator deforms the cushion 16 causing the cushion to engage the cover 22 and force the switch actuator 42 to move, further compressing the spring 46.

Figure 11:
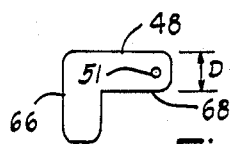
FIG. 11 is an elevation view of a metallic switch contact.

An end wall 44a of the actuator housing 44 supports two metallic switch contacts 48, 50. These switch contacts 48, 50 are oriented parallel to each other and extend outside the housing 44 through two channels 52, 54 in the end wall 44a. Integral with the walls 44b, 44c are two inwardly extending rib members 58, 60 that define two grooves 62, 64. The grooves 62, 64 extend the entire length of the rib members 58, 60 and meet a bottom surface 40b (FIG. 7) of the hub portion 40. The end wall channels 52, 54 extend into the housing approximately half the length of the wall portion 44a. The switch contacts 48, 50 are inserted into the housing 44 so that a inwardly facing edge 66 (FIG. 11) of each contact engages an associated one of the two ribs 58, 60 along one of the two grooves 62, 64. A second edge 68 abuts an end surface 52a or 54a of an associated channel 52 or 54. The contacts 48, 50 extend through the grooves 52, 54 so that an exposed portion of the contacts 48, 50 having a hole 51 extending through the contact (FIG. 11) can be connected to the ignition circuit.

Figure 12:
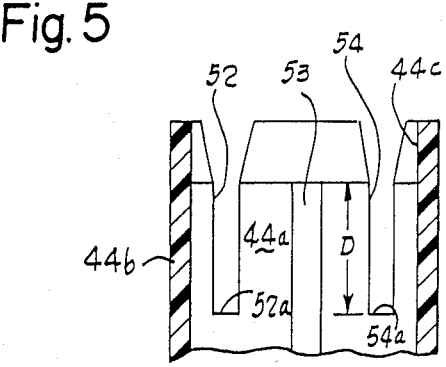
FIG. 12 is a cross-sectional view as seen from the plane 12—12 of FIG. 7 of a switch actuator housing which illustrates feature of the wall portions, grooves and channel.
Figure 6:
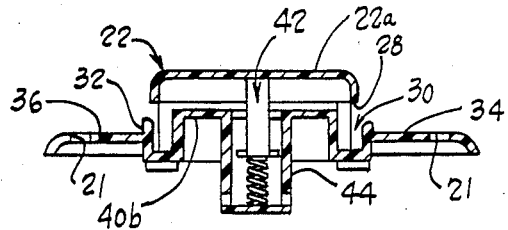
FIG. 6 is a section view of the switch assembly as seen from the plane 6—6 of FIG. 4.

As seen most clearly in FIGS. 7 and 12, the end wall portion 44a is thicker than the two other planar wall portions 44b, 44c. The channels 52, 54 widen near the end of the housing 44 that is enclosed by the cover 45. The exposed portion of the metal contacts 48, 50 have a width D equal to the uniform width portions of the channels 52, 54. The cover 45 has projections 45a, 45b (FIG. 3) that fit into the channels 52, 54 to fill the widened portion of those channels.

Turning now to FIG. 10, the switch actuator 42 is seen to include generally a circular flanged end 70 and two cylindrical body portions 72, 74. Connected to a first cylindrical body portion 72 is a cubelike boss 76 that suports a cylindrical knob 78. When positioned within the housing 44 (FIG. 7), the cylindrical portion 74 of the actuator extends through the opening 41 in the hub 40 and the box 76 fits between the ribs 58, 60 with an end of the knob 78 positioned within a groove 53 in the wall 44a.

The position of the actuator 42 within the housing 44 determines the position of a metal torsional spring switch piece 80 that selectively bridges the two contacts 48, 50. The switch piece 80 is a resiliant wire conductor bent to include a single coil 80a and two extensions 80b, 80c extending away from the coil 80a. The extensions 80b, 80c form an angle of somewhat less than 90°. The coil slips over the cylindrical knob 78 of the actuator before the actuator is placed in the housing 44 so that movement of the actuator 42 also causes the attached switch piece 80 to move.

As seen in FIG. 8 when the actuator 42 is fully extended, the switch piece 80 does not bridge the contacts 48, 50 so the vehicle ignition circuit is open circuited and the vehicle motor will not start even though a user activated ignition switch (not shown) is closed. When the user is seated on the seat (FIG. 9), however, the actuator 42 is pushed into the housing 44 by the cover 22, causing the switch piece 80 to bridge the space between the two contacts 48, 50 and close the ignition circuit.

OPERATION

With the actuator and metal switch contacts 48, 50 in place within the housing 44 the spring 46 is seated within a cylindrical recess 90 inside the actuator 42. The cover 45 is then welded to the housing with the spring 46 and contacts 48, 50 properly positioned inside the housing 44. The cover 22 is then attached to the base 20 by flexing the legs 24 and pushing them through the openings 26. The entire assembly 10 is then mounted to the seat pan 14.

With the seat 12 unoccupied the contacts 48, 50 are open and the ignition circuit de-activated. With the user seated on the seat 12 the switch piece 80 bridges the contacts 48, 50, allowing the operator to start and operate the vehicle. The operator can shift his or her weight in the seat and still maintain the actuator depressed within the housing 44 a sufficient amount to allow continued vehicle operation. If however the operator steps from or is thrown from the seat 14 the compressed spring 46 moves the actuator 42 and the switch piece 80 to open the ignition circuit.

Although the present invention has been described with a degree of particularity, it is the intent that the invention include all modifications and alterations falling within the spirit or scope of the appended claims.

I claim:

1. A vehicle seat switch assembly comprising:
   (a) switch means for opening and closing a vehicle ignition circuit including (i) two spaced switch contacts forming part of the ignition circuit; (ii) a switch housing to support the two spaced switch contacts; (iii) a switch actuator located within said switch housing and including a plunger extending through an opening in said switch housing for opening and closing said switch contacts, said switch actuator including a metallic switch member inside the switch housing for bridging a gap between the two spaced switch contacts; and (iv) a spring positioned within the housing to bias the switch actuator to extend the plunger through the opening in said housing;

(b) cover means having a first inner surface for engaging the switch actuator plunger and a second outer surface for engagement with a seat cushion, said cover means further comprises a plurality of resilient legs coupled to said cover and having flanged ends; and (c) base means for coupling said switch means to the vehicle seat with the plunger facing upward away from the seat, said base means defining openings to receive the flanged ends of the resilient legs of said base whereby the legs are deflected to pass through the openings and then released to a configuration allowing the cover means to move relative to the base and engage said switch plunger in response to engagement with the seat cushion.

2. The assembly of claim 1 where the two spaced switch contacts are normally open and movement of said actuator in response to a vehicle operator positioned on said seat cushion moves the metallic switch member to a position to short said contacts and close the vehicle ignition circuit.

3. A switch assembly for controlling the operating state of a motor vehicle comprising:
  a switch housing including two metallic switch contacts in spaced relation to each other in said housing;
  a switch actuator mounted within the housing and having a plunger extending through an opening in said housing, said actuator including a metallic torsional spring switch member for selectively bridging a gap between said two metallic switch contacts;
  biasing means for biasing the actuator to extend said plunger through the opening in said housing;
  base means for coupling said switch housing to a vehicle seat pan in a position beneath a seat cushion so that said seat cushion forces the plunger into the housing against the biasing action of the biasing means to move said metallic switch torsional spring member in relation to said two switch contacts with a operator seated on the seat cushion; and
  cover means movably mounted to the base means, said cover means including a circular body portion having a seat cushion engaging surface spaced from an oppositely facing plunger engaging surface, said cover means further including a plurality of flexible leg members with flanged ends spaced about an outer perimeter of said circular body portion to pass through corresponding openings in said base means for attaching the cover means to the base means with the circular body portion interposed between the plunger and the seat cushion so that engagement between the seat cushion and the seat cushion engaging surface forces the flexible leg members into the openings in said base and pushes said plunger into the housing.

4. The switch assembly of claim 3 where the switch torsional spring member bridges the two metallic switch contacts with a user seated on the vehicle seat.

* * * * *